(12) United States Patent
Kim et al.

(10) Patent No.: US 11,691,561 B2
(45) Date of Patent: Jul. 4, 2023

(54) LAMP APPARATUS OF VEHICLE AND CONTROL METHOD THEREOF

(71) Applicant: HYUNDAI MOBIS CO., LTD., Seoul (KR)

(72) Inventors: Jong Su Kim, Yongin-si (KR); Ya Won Kim, Yongin-si (KR); Seung Yeon Lee, Yongin-si (KR); Dong Hyuk Jung, Yongin-si (KR); Jong Hwa Kim, Yongin-si (KR); Eun Hee Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 41 days.

(21) Appl. No.: 16/993,777

(22) Filed: Aug. 14, 2020

(65) Prior Publication Data
US 2021/0078485 A1 Mar. 18, 2021

(30) Foreign Application Priority Data
Sep. 16, 2019 (KR) .................. 10-2019-0113389

(51) Int. Cl.
*B60Q 1/12* (2006.01)
*B60Q 1/14* (2006.01)
*B60Q 1/30* (2006.01)
*B60Q 1/22* (2006.01)
*B60Q 1/34* (2006.01)

(52) U.S. Cl.
CPC .......... *B60Q 1/122* (2013.01); *B60Q 1/1423* (2013.01); *B60Q 1/30* (2013.01); *B60Q 2300/122* (2013.01); *B60Q 2300/142* (2013.01)

(58) Field of Classification Search
CPC .......... B60Q 1/2607; B60Q 1/30; B60Q 1/22; B60Q 1/34; B60Q 1/44; B60Q 1/50; B60Q 2400/20; B60Q 1/2696; B60Q 2400/50; B60Q 1/0041; B60Q 1/04
See application file for complete search history.

(56) References Cited

U.S. PATENT DOCUMENTS

| | | | | |
|---|---|---|---|---|
| 2011/0018441 A1* | 1/2011 | Tanaka | .................. | H05B 35/00 315/77 |
| 2013/0169155 A1* | 7/2013 | Nakashima | ............ | B60Q 1/143 315/82 |

(Continued)

FOREIGN PATENT DOCUMENTS

KR         10-1360345 B1       2/2014

*Primary Examiner* — Wei (Victor) Y Chan
(74) *Attorney, Agent, or Firm* — NovoTechIP International PLLC

(57) ABSTRACT

Provided are a lamp apparatus of a vehicle and a control method thereof. The lamp apparatus includes: a first integrated lamp installed at either the front or rear of a vehicle and having a plurality of lamps, one or more of which being turned on according to a lighting mode; a second integrated lamp installed at a position different from the installation position of the first integrated lamp and having a plurality of lamps, one or more of which being turned on; a travel direction input unit that receives a travel direction; a driving signal input unit that receives driving signals for turning on and off the lamps; and a lamp control unit that receives the travel direction to set the lighting modes of the first and second integrated lamps, and drives one or more of the plurality of lamps included in each of them.

17 Claims, 9 Drawing Sheets

(56) References Cited

U.S. PATENT DOCUMENTS

2016/0355123 A1* 12/2016 Oooka ................... B60Q 1/381
2019/0168664 A1*  6/2019 Tatara ................... B60Q 9/008
2020/0001776 A1*  1/2020 Potter ................. B60Q 1/1423

* cited by examiner

LAMP APPARATUS OF VEHICLE AND CONTROL METHOD THEREOF

CROSS-REFERENCE TO RELATED APPLICATION

This application claims priority from and the benefit of Korean Patent Application No. 10-2019-0113389, filed on Sep. 16, 2019, which is hereby incorporated by reference for all purposes as if set forth herein.

BACKGROUND

Field

Exemplary embodiments of the present disclosure relate to a lamp apparatus of a vehicle and a control method thereof, and more particularly, to a lamp apparatus of a vehicle, which is configured with integrated lamps of head lamps and rear lamps, may be installed in the front and rear of the vehicle in the same way, and may perform a head lamp function and a read lamp function according to a travel direction, and a control method thereof.

Discussion of the Background

In general, a vehicle includes a lighting device for the purpose of making it easier to see objects in the traveling direction during night driving and for informing users of other vehicles or other roads of the travel state of the vehicle.

The lighting device is a head lamp also called a headlight, which is a lamp that serves to illuminate a path in front of the vehicle, is turned on so as to check obstacles on a road at a distance of 100 m ahead at night, and adopts a position lamp (PSTN) that indicates the presence and width of the vehicle when turned on at night.

Furthermore, the rear lamp is a lamp located at the rear of the vehicle, is composed of a brake light that is turned on when a brake pedal is pressed, a turn indicator that informs a direction change, a reverse light that is turned on when a reverse gear is inserted, and the like, and refers to a lamp serving to perform a complex function.

Recently, in order to reduce traffic accidents, the regulations have been newly established to turn on a lamp even during the daytime, and a daytime running light (DRL) is included in the head lamp to comply with such regulations.

The background art of the present disclosure is disclosed in Korean Patent No. 1360345 (published on Feb. 10, 2014 and entitled "Lamp Apparatus for an Automobile").

SUMMARY

As described above, since the head lamp and the rear lamp are separately developed for each use and are mounted according to a vehicle type, there is a problem in that production and management costs are expensive.

Furthermore, the head lamp and the rear lamp are turned on according to the use of front and rear lamps. Thus, even when two-way driving of a vehicle is possible by fully autonomous driving, the two-way driving may be difficult due to limited functions of the head lamp and the rear lamp.

Various embodiments are directed to providing a lamp apparatus of a vehicle, which is configured with integrated lamps of head lamps and rear lamps, may be installed in the front and rear of the vehicle in the same way, and may perform a head lamp function and a read lamp function according to a travel direction, and a control method thereof.

In an embodiment, a lamp apparatus of a vehicle includes: a first integrated lamp installed at either a front or a rear of a vehicle and having a plurality of lamps, one or more of the plurality of lamps being turned on according to a lighting mode; a second integrated lamp installed at a position different from the position, where the first integrated lamp is installed, between the front and rear of the vehicle and having a plurality of lamps, one or more of the plurality of lamps being turned on according to the lighting mode; a travel direction input unit configured to receive a travel direction from a peripheral control device of the vehicle; a driving signal input unit configured to receive driving signals for turning on and off the lamps from the peripheral control device of the vehicle; and a lamp control unit configured to receive the travel direction from the travel direction input unit to set the lighting modes for the first integrated lamp and the second integrated lamp, and to drive one or more of the plurality of lamps, which are included in each of the first integrated lamp and the second integrated lamp, according to the driving signals, which are inputted from the driving signal input unit, on the basis of the set lighting modes.

In the present disclosure, the travel direction includes any one of a rotational direction of wheels, a position of a shift lever, and a position of an opposing vehicle.

In the present disclosure, the lamp control unit includes: a mode setting section configured to receive the travel direction and set the lighting modes; a first lamp driving section configured to receive a low beam driving signal and a stop light driving signal according to the lighting modes, and to drive each of the first integrated lamp and the second integrated lamp; a second lamp driving section configured to receive a high beam driving signal and a reverse light driving signal according to the lighting modes, and to drive each of the first integrated lamp and the second integrated lamp; a third lamp driving section configured to receive a tail light driving signal and a daytime running light driving signal according to the lighting modes, and to drive each of the first integrated lamp and the second integrated lamp; a fourth lamp driving section configured to receive a turn indicator driving signal, and to drive each of the first integrated lamp and the second integrated lamp; and a fifth lamp driving section configured to receive a steering angle signal, and to drive each of the first integrated lamp and the second integrated lamp.

In the present disclosure, each of the first integrated lamp and the second integrated lamp includes: a first lamp operated as a low beam or a stop light; a second lamp operated as a high beam or a reverse light; a third lamp operated as a daytime running light or a tail light; a fourth lamp operated as a turn indicator; and a fifth lamp operated as left and right static bending lights.

In the present disclosure, when the lighting mode is a front mode, the first lamp is operated as the low beam, the second lamp is operated as the high beam, the third lamp is operated as the daytime running light, the fourth lamp is operated as the turn indicator, and the fifth lamp is operated as the left and right static bending lights.

In the present disclosure, when the lighting mode is a rear mode, the first lamp is operated as the stop light, the second lamp is operated as the reverse light, the third lamp is operated as the tail light, the fourth lamp is operated as the turn indicator, and the fifth lamp is turned off.

In the present disclosure, the lamp control unit sets the lighting modes so as for the front mode and the rear mode to be opposite to each other in the first integrated lamp and the second integrated lamp.

In an embodiment, a control method of a lamp apparatus of a vehicle includes: a step in which a lamp control unit receives a travel direction through a travel direction input unit; a step in which the lamp control unit sets lighting modes for a first integrated lamp and a second integrated lamp according to the travel direction; a step in which the lamp control unit receives driving signals for turning on and off the lamps from a driving signal input unit; and a step in which the lamp control unit drives one or more of a plurality of lamps, which are included in each of the first integrated lamp and the second integrated lamp, according to the inputted driving signals on the basis of the set lighting modes.

In the present disclosure, the travel direction includes any one of a rotational direction of wheels, a position of a shift lever, and a position of an opposing vehicle.

In the present disclosure, in the step of setting the lighting modes for the first integrated lamp and the second integrated lamp, the lamp control unit sets the lighting modes so as for the front mode and the rear mode to be opposite to each other in the first integrated lamp and the second integrated lamp.

In the present disclosure, in the step of driving each of the first integrated lamp and the second integrated lamp, when the lighting mode is the front mode, the lamp control unit operates a first lamp as a low beam, operates a second lamp as a high beam, operates a third lamp as a daytime running light, operates a fourth lamp as a turn indicator, and operates a fifth lamp as left and right static bending lights, the first to fifth lamps constituting each of the first integrated lamp and the second integrated lamp.

In the present disclosure, in the step of driving each of the first integrated lamp and the second integrated lamp, when the lighting mode is a rear mode, the lamp control unit operates the first lamp as a stop light, operates the second lamp as a reverse light, operates the third lamp as a tail light, operates the fourth lamp as the turn indicator, and turns off the fifth lamp, the first to fifth lamps constituting each of the first integrated lamp and the second integrated lamp.

In accordance with the lamp apparatus of a vehicle and the control method thereof according to an aspect of the present disclosure, the lamp apparatus of a vehicle is configured with integrated lamps of head lamps and rear lamps, may be installed in the front and rear of the vehicle in the same way, and may perform a head lamp function and a read lamp function according to a travel direction. Therefore, the lamp apparatus of a vehicle and the control method thereof can reduce production and management costs and can be applied to two-way driving by fully autonomous driving.

DETAILED DESCRIPTION OF THE ILLUSTRATED EMBODIMENTS

Figure 1:
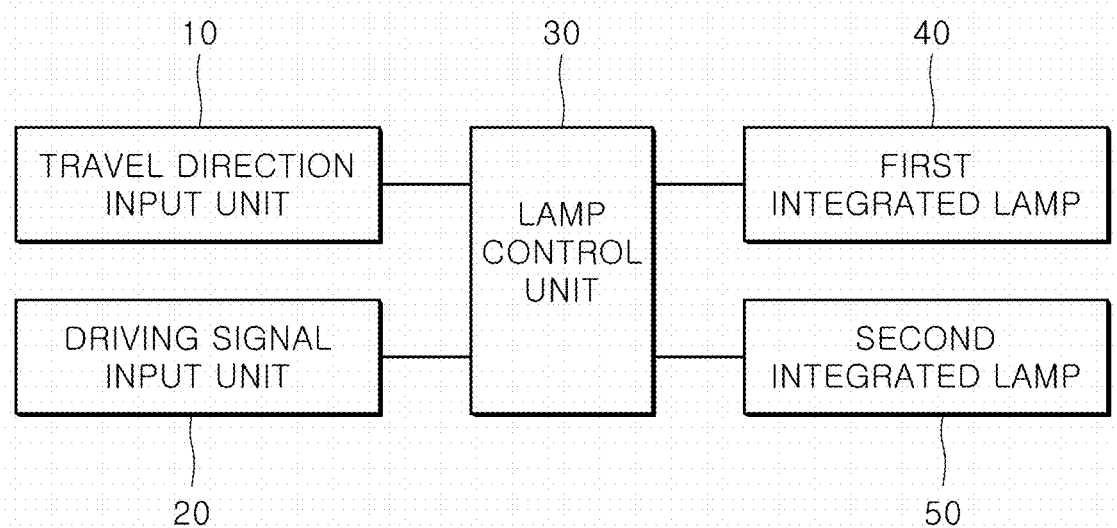
FIG. 1 is a block configuration diagram illustrating a lamp apparatus of a vehicle in accordance with an embodiment of the present disclosure.

Hereinafter, a lamp apparatus of a vehicle and a control method thereof in accordance with the present disclosure will be described below with reference to the accompanying drawings. In this process, the thicknesses of lines or the sizes of elements illustrated in the drawings may be exaggerated for the purpose of clarity and convenience of explanation. Terms to be described later are terms defined in consideration of functions thereof in the present disclosure and may be changed according to the intention of a user or an operator, or practice. Accordingly, such terms should be defined based on the disclosure over the present specification.

Figure 2:
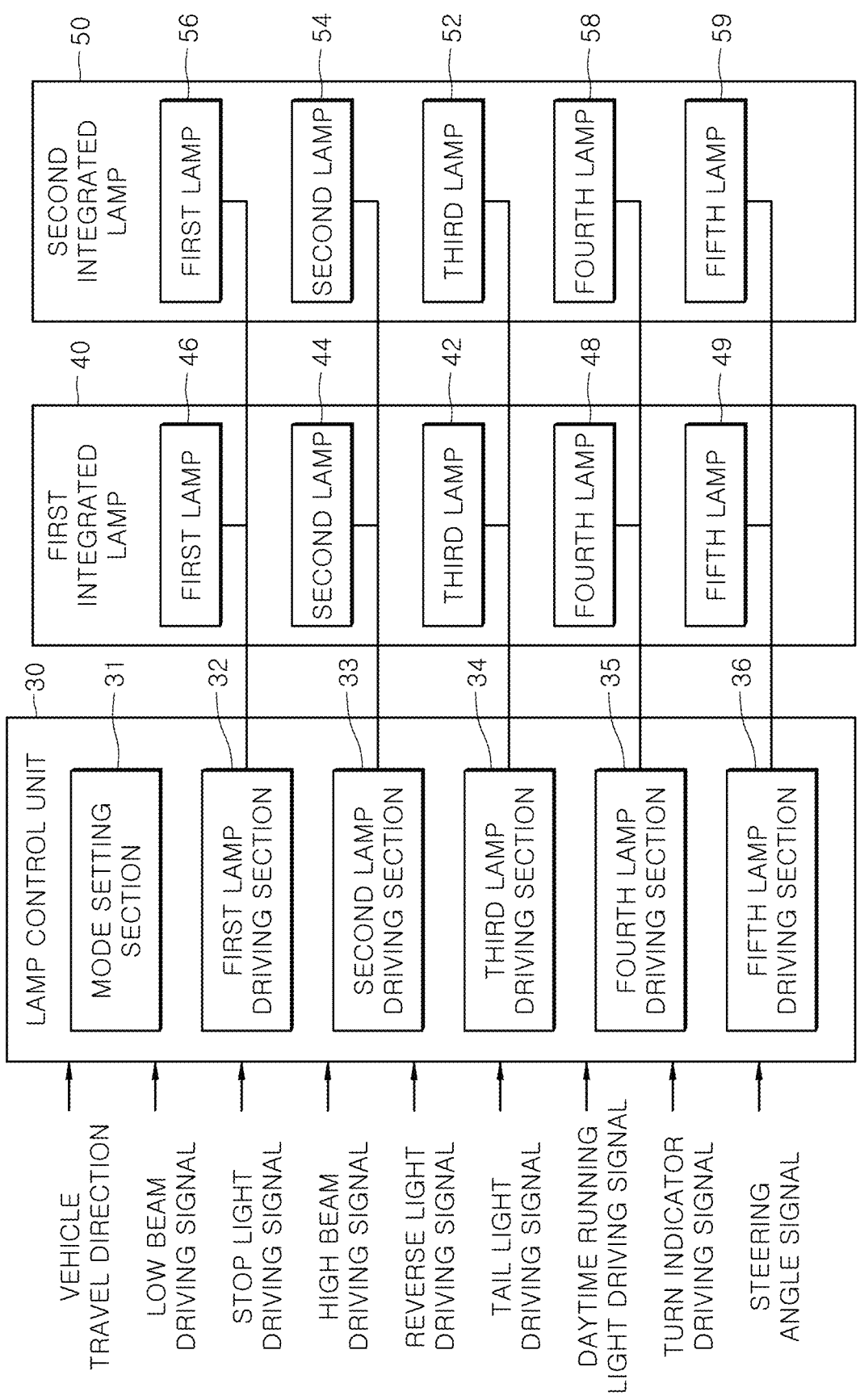
FIG. 2 is a more detailed block configuration diagram illustrating a lamp control unit of the lamp apparatus of a vehicle in accordance with an embodiment of the present disclosure.
Figure 3:
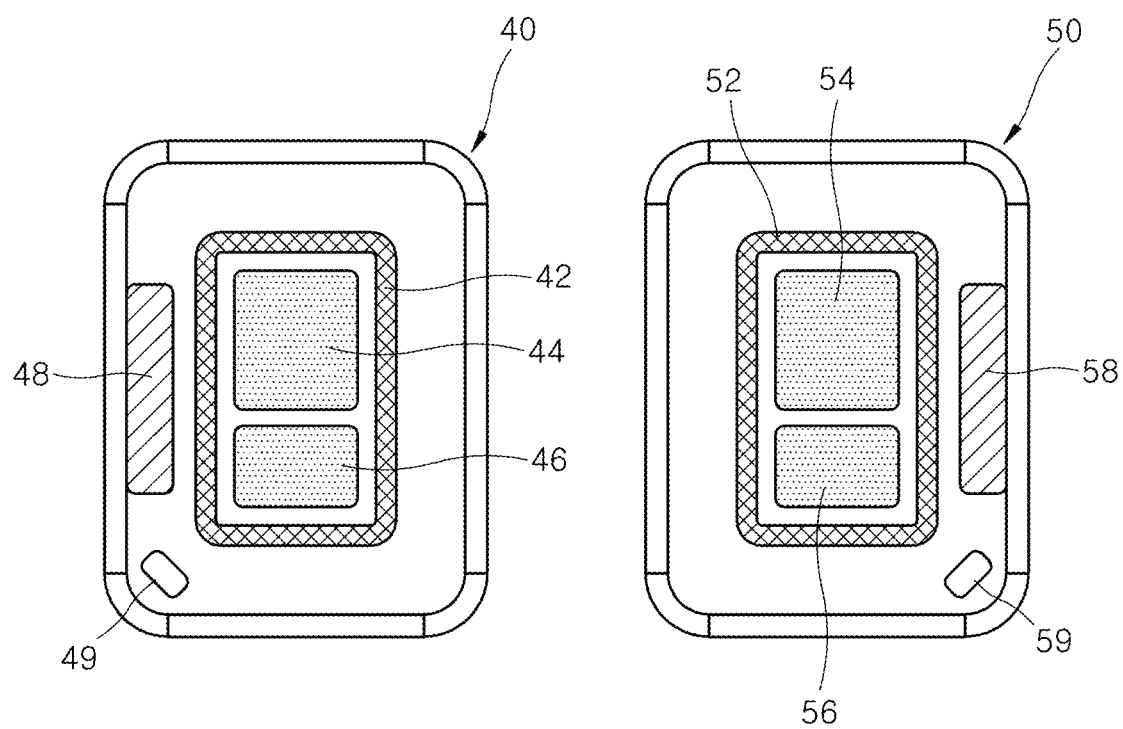
FIG. 3 is an exemplary diagram illustrating integrated lamps in the lamp apparatus of a vehicle in accordance with an embodiment of the present disclosure.

FIG. 1 is a block configuration diagram illustrating a lamp apparatus of a vehicle in accordance with an embodiment of the present disclosure, FIG. 2 is a more detailed block configuration diagram illustrating a lamp control unit of the lamp apparatus of a vehicle in accordance with an embodiment of the present disclosure, and FIG. 3 is an exemplary diagram illustrating integrated lamps in the lamp apparatus of a vehicle in accordance with an embodiment of the present disclosure.

As illustrated in FIG. 1 to FIG. 3, the lamp apparatus of a vehicle in accordance with an embodiment of the present disclosure may include a first integrated lamp 40, a second integrated lamp 50, a travel direction input unit 10, a driving signal input unit 20, and a lamp control unit 30.

The first integrated lamp 40 may be installed at either a front or rear of a vehicle and may be turned on so as to perform a head lamp function or a rear lamp function when one or more of a plurality of lamps included in the first integrated lamp 40 are turned on according to a lighting mode.

The second integrated lamp 50 may be installed at a position different from the position, where the first integrated lamp 40 is installed, between the front or rear of the vehicle and may be turned on so as to perform a head lamp function or a rear lamp function when one or more of a plurality of lamps included in the second integrated lamp 50 are turned on according to the lighting mode.

Furthermore, the first integrated lamp 40 and the second integrated lamp 50 are operated so as to perform functions opposite to each other. That is, when the first integrated lamp 40 is turned on so as to perform the head lamp function, the second integrated lamp 50 is turned on so as to perform the rear lamp function, and when the first integrated lamp 40 is turned on so as to perform the rear lamp function, the second integrated lamp 50 is turned on so as to perform the head lamp function.

The first integrated lamp 40 and the second integrated lamp 50 may be formed in substantially the same shape or configuration as illustrated in the exemplary diagram of FIG. 3. FIG. 3 illustrates only one of left lamps and right lamps constituting the first integrated lamp 40 and only one of left lamps and right lamps constituting the second integrated lamp 50.

That is, the first integrated lamp 40 may include a first lamp 46, a second lamp 44, a third lamp 42, a fourth lamp 48, and a fifth lamp 49, and the second integrated lamp 50 may include a first lamp 56, a second lamp 54, a third lamp 52, a fourth lamp 58, and a fifth lamp 59. The first lamps 46 and 56 may be operated as a low beam or a stop light, the second lamps 44 and 54 may be operated as a high beam or a reverse light, the third lamps 42 and 52 may be operated as a daytime running light or a tail light, the fourth lamps 48 and 58 may be operated as a turn indicator, and the fifth lamps 49 and 59 may be operated as left and right static bending lights.

Here, the function in which the second lamps 44 and 54 are operated as the reverse light may be deleted in a case of a vehicle whose two-way driving is possible.

Meanwhile, when the vehicle is turning such as when turning right or left, the fifth lamps 49 and 59 serve as lamps for improving the visibility of a driver for the turning direction by emitting light in the turning direction. For example, when the vehicle turns right, the fifth lamps 49 and 59 operate to illuminate the right direction in order to secure visibility for the right direction, and when the vehicle turns left, the fifth lamps 49 and 59 operate to illuminate the left direction in order to secure visibility for the left direction. In such cases, angles and light amounts (that is, light emission distances) at which the fifth lamps 49 and 59 emit light leftward or rightward may be predefined according to the specifications of the vehicle and the lamps. Furthermore, the installation positions of the fifth lamps 49 and 59 illustrated in FIG. 3 are exemplary, and may be installed at various positions within the first integrated lamp 40 and the second integrated lamp 50 according to the design specifications of the vehicle.

At this time, the first integrated lamp 40 and the second integrated lamp 50 may be composed of three-color LEDs so that they may be turned on in white, yellow, and red according to the function of lamps.

The travel direction input unit 10 may receive a travel direction from a peripheral control device of the vehicle and provide the travel direction to the lamp control unit 30 so that the lamp control unit 30 sets lighting modes.

The travel direction may include any one of a rotational direction of wheels, a position of a shift lever, and a position of an opposing vehicle. In addition, the travel direction input unit 10 may receive, as the travel direction, any information capable of determining the travel direction of the vehicle.

The driving signal input unit 20 may receive driving signals for turning on and off the lamps from the peripheral control device of the vehicle, and provide the driving signals to the lamp control unit 30.

For example, the driving signal input unit 20 may receive a low beam driving signal, a stop light driving signal, a high beam driving signal, a reverse light driving signal, a tail light driving signal, a daytime running light driving signal, a turn indicator driving signal, and a steering angle signal.

The daytime running light driving signal may also be used as a position lamp driving signal.

The lamp control unit 30 may receive the travel direction from the travel direction input unit 10 to set the lighting modes for the first integrated lamp 40 and the second integrated lamp 50, and may drive one or more of the plurality of lamps, which are included in each of the first integrated lamp 40 and the second integrated lamp 50, according to the driving signals, which are inputted from the driving signal input unit 20, on the basis of the set lighting modes.

As illustrated in FIG. 2, the lamp control unit 30 may include a mode setting section 31, a first lamp driving section 32, a second lamp driving section 33, a third lamp driving section 34, a fourth lamp driving section 35, and a fifth lamp driving section 36. The mode setting section 31 receives the travel direction and sets the lighting modes. The first lamp driving section 32 receives the low beam driving signal and the stop light driving signal according to the lighting modes, and drives the first lamp 46 of the first integrated lamp 40 and the first lamp 56 of the second integrated lamp 50. The second lamp driving section 33 receives the high beam driving signal and the reverse light driving signal according to the lighting modes, and drives the second lamp 44 of the first integrated lamp 40 and the second lamp 54 of the second integrated lamp 50. The third lamp driving section 34 receives the tail light driving signal and the daytime running light driving signal according to the lighting modes, and drives the third lamp 42 of the first integrated lamp 40 and the third lamp 52 of the second integrated lamp 50. The fourth lamp driving section 35 receives the turn indicator driving signal and drives the fourth lamp 48 of the first integrated lamp 40 and the fourth lamp 58 of the second integrated lamp 50. The fifth lamp driving section 36 receives the steering angle signal and drives the fifth lamp 49 of the first integrated lamp 40 and the fifth lamp 59 of the second integrated lamp 50.

Here, when setting the lighting mode, the lamp control unit 30 may set the lighting modes for a front mode and a rear mode to be opposite to each other in the first integrated lamp 40 and the second integrated lamp 50. That is, when setting the lighting mode of the first integrated lamp 40 to the front mode, the lamp control unit 30 may set the lighting mode of the second integrated lamp 50 to the rear mode, and when setting the lighting mode of the first integrated lamp 40 to the rear mode, the lamp control unit 30 may set the lighting mode of the second integrated lamp 50 to the front mode.

For example, the mode setting section 31 may set the lighting mode of the first integrated lamp 40 to the front mode and set the lighting mode of the second integrated lamp 50 to the rear mode according to the travel direction.

In a case where the lighting mode of the first integrated lamp 40 is the front mode, when the low beam is on according to the low beam driving signal, the first lamp driving section 32 may turn on the first lamp 46 of the first integrated lamp 40 in order to turn on the low beam, and when the low beam is not on, the first lamp driving section 32 may turn off the first lamp 46 of the first integrated lamp 40 in order to turn off the low beam.

Meanwhile, in a case where the lighting mode of the first integrated lamp 40 is the rear mode, when the stop light is on according to the stop light driving signal, the first lamp driving section 32 may turn on the first lamp 46 of the first integrated lamp 40 in order to turn on the stop light, and when the stop light is not on, the first lamp driving section 32 may turn off the first lamp 46 of the first integrated lamp 40 in order to turn off the stop light.

Furthermore, the first lamp driving section 32 may drive the second integrated lamp 50 in substantially the same manner as in the first integrated lamp 40 on the basis of the low beam driving signal and the stop light driving signal according to the front mode and the rear mode.

In a case where the lighting mode of the first integrated lamp 40 is the front mode, when the high beam is on according to the high beam driving signal, the second lamp driving section 33 may turn on the second lamp 44 of the first integrated lamp 40 in order to turn on the high beam, and when the high beam is not on, the second lamp driving section 33 may turn off the second lamp 44 of the first integrated lamp 40 in order to turn off the high beam.

Meanwhile, in a case where the lighting mode of the first integrated lamp 40 is the rear mode, when the reverse light is on according to the reverse light driving signal, the second lamp driving section 33 may turn on the second lamp 44 of the first integrated lamp 40 in order to turn on the reverse light, and when the reverse light is not on, the second lamp driving section 33 may turn off the second lamp 44 of the first integrated lamp 40 in order to turn off the reverse light.

Furthermore, the second lamp driving section 33 may drive the second integrated lamp 50 in substantially the same manner as in the first integrated lamp 40 on the basis of the high beam driving signal and the reverse light driving signal according to the front mode and the rear mode.

Meanwhile, the function in which the second lamps 44 and 54 are operated as the reverse light may be deleted in a case of a vehicle whose two-way driving is possible.

In a case where the lighting mode of the first integrated lamp 40 is the front mode, when the daytime running light is on according to the daytime running light driving signal, the third lamp driving section 34 may turn on the third lamp 42 of the first integrated lamp 40 in order to turn on the daytime running light, and when the daytime running light is not on, the third lamp driving section 34 may turn off the third lamp 42 of the first integrated lamp 40 in order to turn off the daytime running light.

Meanwhile, in a case where the lighting mode of the first integrated lamp 40 is the rear mode, when the tail light is on according to the tail light driving signal, the third lamp driving section 34 may turn on the third lamp 42 of the first integrated lamp 40 in order to turn on the tail light, and when the tail light is not on, the third lamp driving section 34 may turn off the third lamp 42 of the first integrated lamp 40 in order to turn off the tail light.

Furthermore, the third lamp driving section 34 may drive the second integrated lamp 50 in substantially the same manner as in the first integrated lamp 40 on the basis of the daytime running light driving signal and the tail light driving signal according to the front mode and the rear mode.

The fourth lamp driving section 35 may turn on and off the fourth lamp 48 of the first integrated lamp 40 and the fourth lamp 58 of the second integrated lamp 50 on the basis of the turn indicator driving signal.

That is, when the left turn indicator is on according to the turn indicator driving signal, the fourth lamp driving section 35 may turn on the fourth lamp 48 of the first integrated lamp 40 and the fourth lamp 58 of the second integrated lamp 50, which are installed on the left side of the vehicle, in order to turn on the left turn indicator. When the right turn indicator is on according to the turn indicator driving signal, the fourth lamp driving section 35 may turn on the fourth lamp 48 of the first integrated lamp 40 and the fourth lamp 58 of the second integrated lamp 50, which are installed on the right side of the vehicle, in order to turn on the right turn indicator.

When the lighting mode of the first integrated lamp 40 is the front mode, the fifth lamp driving section 36 may control the fifth lamp 49 of the first integrated lamp 40 to be turned on and off on the basis of the steering angle signal.

That is, when the steering angle signal corresponds to a preset reference angle or more in the left direction (for example, steering angle≥+30°, + indicates the left side), the fifth lamp driving section 36 may turn on the fifth lamp 49 of the first integrated lamp 40 installed on the left side of the vehicle and turn off the fifth lamp 49 of the first integrated lamp 40 installed on the right side of the vehicle. When the steering angle signal corresponds to a preset reference angle or more in the right direction (for example, steering angle≤−30°, − indicates the right side), the fifth lamp driving section 36 may turn on the fifth lamp 49 of the first integrated lamp 40 installed on the right side of the vehicle and turn off the fifth lamp 49 of the first integrated lamp 40 installed on the left side of the vehicle. When the steering angle signal does not correspond to the aforementioned cases (for example, −30°<steering angle<+30°), the fifth lamp driving section 36 may substantially maintain the turn-off states of the fifth lamps 49 of the first integrated lamp 40 installed on the left and right sides of the vehicle. The reference angle may be preset to various values on the basis of the specifications of the vehicle and the lamps and the experimental results of a designer.

Meanwhile, when the lighting mode of the first integrated lamp 40 is the rear mode, the fifth lamp driving section 36 may turn off all the fifth lamps 49 of the first integrated lamp 40 installed on the left and right sides of the vehicle.

Furthermore, the fifth lamp driving section 36 may drive the second integrated lamp 50 in substantially the same manner as in the first integrated lamp 40 on the basis of the steering angle signal according to the front mode and the rear mode.

As described above, the lamp apparatus of a vehicle according to an embodiment of the present disclosure is configured with integrated lamps of head lamps and rear lamps, may be installed in the front and rear of the vehicle in the same way, and may perform a head lamp function and a read lamp function according to a travel direction. Therefore, the lamp apparatus can reduce production and management costs and can be applied to two-way driving by fully autonomous driving.

FIG. 4 to FIG. 9 are flowcharts for explaining a control method of the lamp apparatus of a vehicle in accordance with an embodiment of the present disclosure.

Figure 4:
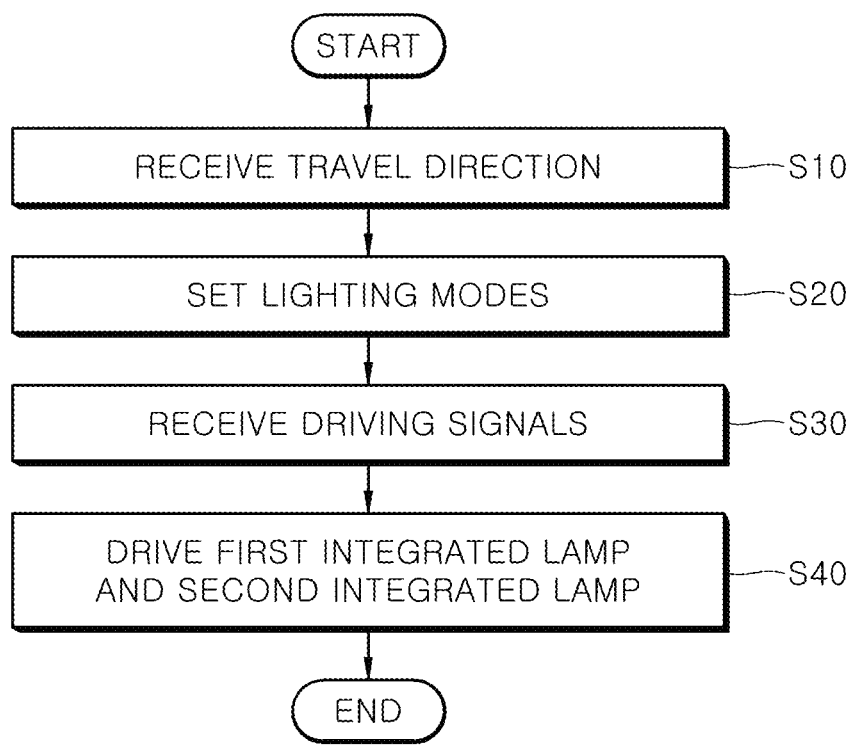
FIG. 4 to FIG. 9 are flowcharts for explaining a control method of the lamp apparatus of a vehicle in accordance with an embodiment of the present disclosure.

As illustrated in FIG. 4, in the control method of the lamp apparatus of a vehicle in accordance with an embodiment of the present disclosure, the lamp control unit 30 first receives a travel direction through the travel direction input unit 10 (S10).

The travel direction may include any one of the rotational direction of the wheels, the position of the shift lever, and the position of the opposing vehicle. In addition, the lamp control unit 30 may receive, as the travel direction, any information capable of determining the travel direction of the vehicle may be received.

After receiving the travel direction in step S10, the lamp control unit 30 sets lighting modes for driving the first integrated lamp 40 and the second integrated lamp 50 according to the travel direction (S20).

Here, the lamp control unit 30 may set the lighting modes so as for the front mode and the rear mode to be opposite to each other in the first integrated lamp 40 and the second integrated lamp 50.

After setting the lighting modes in step S20, the lamp control unit 30 receives driving signals for turning on and off the lamps from the driving signal input unit 20 (S30).

Here, the driving signals may include the low beam driving signal, the stop light driving signal, the high beam driving signal, the reverse light driving signal, the tail light driving signal, the daytime running light driving signal, and the turn indicator driving signal. Furthermore, the daytime running light driving signal may also be used as a position lamp driving signal.

After receiving the driving signals in step S30, the lamp control unit 30 drives one or more of the plurality of lamps, which are included in each of the first integrated lamp 40 and the second integrated lamp 50, according to the inputted driving signals on the basis of the set lighting modes (S40).

The above will be described in detail below.

Although the following description is made by taking the first integrated lamp 40 as an example, the second integrated lamp 50 is operated in substantially the same manner as the first integrated lamp 40.

Figure 5:
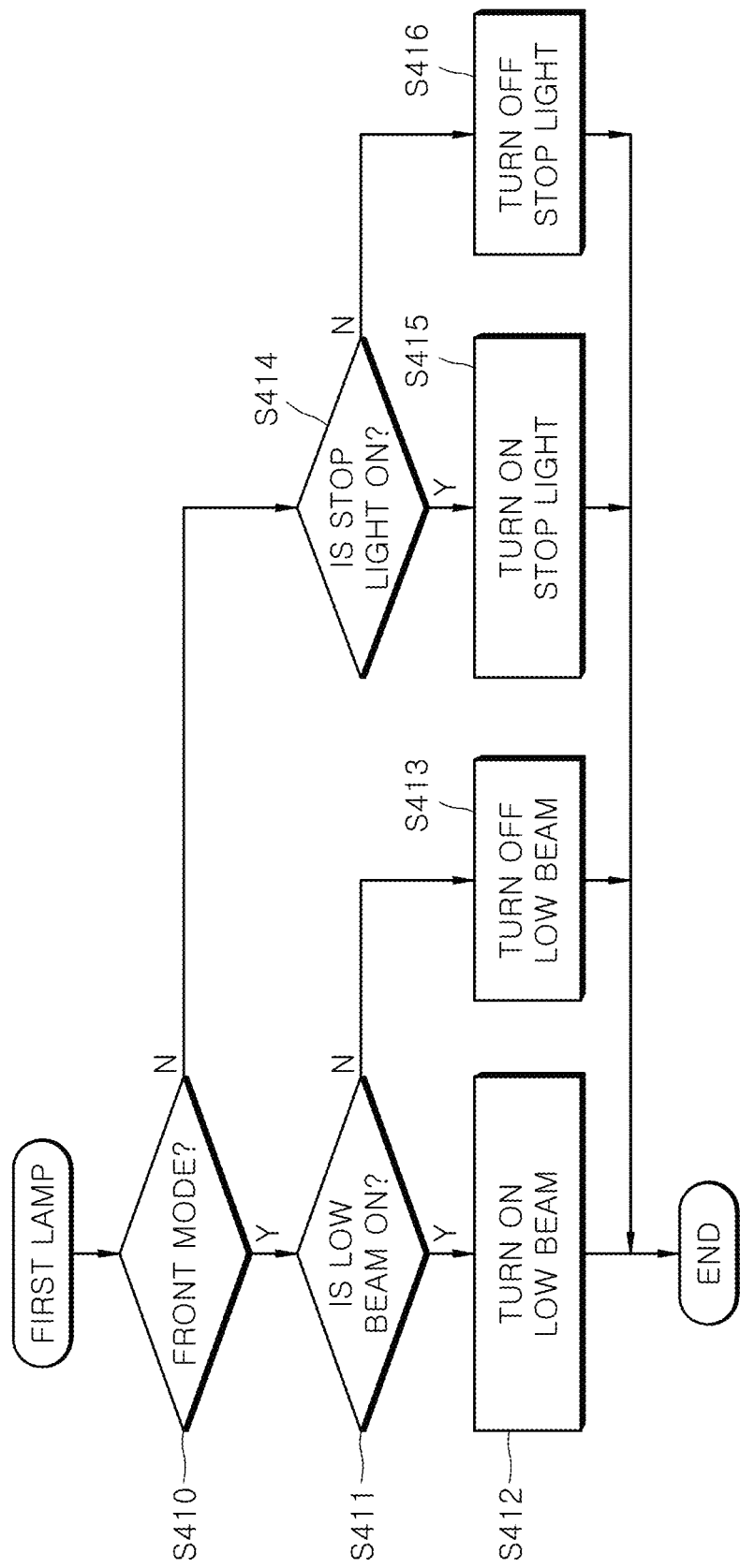

First, the operation of the first lamp 46 will be described. As illustrated in FIG. 5, the lamp control unit 30 determines whether the lighting mode of the first integrated lamp 40 is the front mode (S410).

When it is determined in step S410 that the lighting mode of the first integrated lamp 40 is the front mode, the lamp control unit 30 determines whether the low beam is on according to the low beam driving signal (S411).

When it is determined in step S411 that the low beam is on, the lamp control unit 30 turns on the first lamp 46 in order to turn on the low beam (S412).

On the other hand, when it is determined in step S411 that the low beam is not on, the lamp control unit 30 turns off the first lamp 46 in order to turn off the low beam (S413).

Meanwhile, when it is determined in step S410 that the lighting mode of the first integrated lamp 40 is not the front mode but the rear mode, the lamp control unit 30 determines whether the stop light is on according to the stop light driving signal (S414).

When it is determined in step S414 that the stop light is on, the lamp control unit 30 turns on the first lamp 46 in order to turn on the stop light (S415).

On the other hand, when it is determined in step S414 that the stop light is not on, the lamp control unit 30 turns off the first lamp 46 in order to turn off the stop light (S416).

Figure 6:
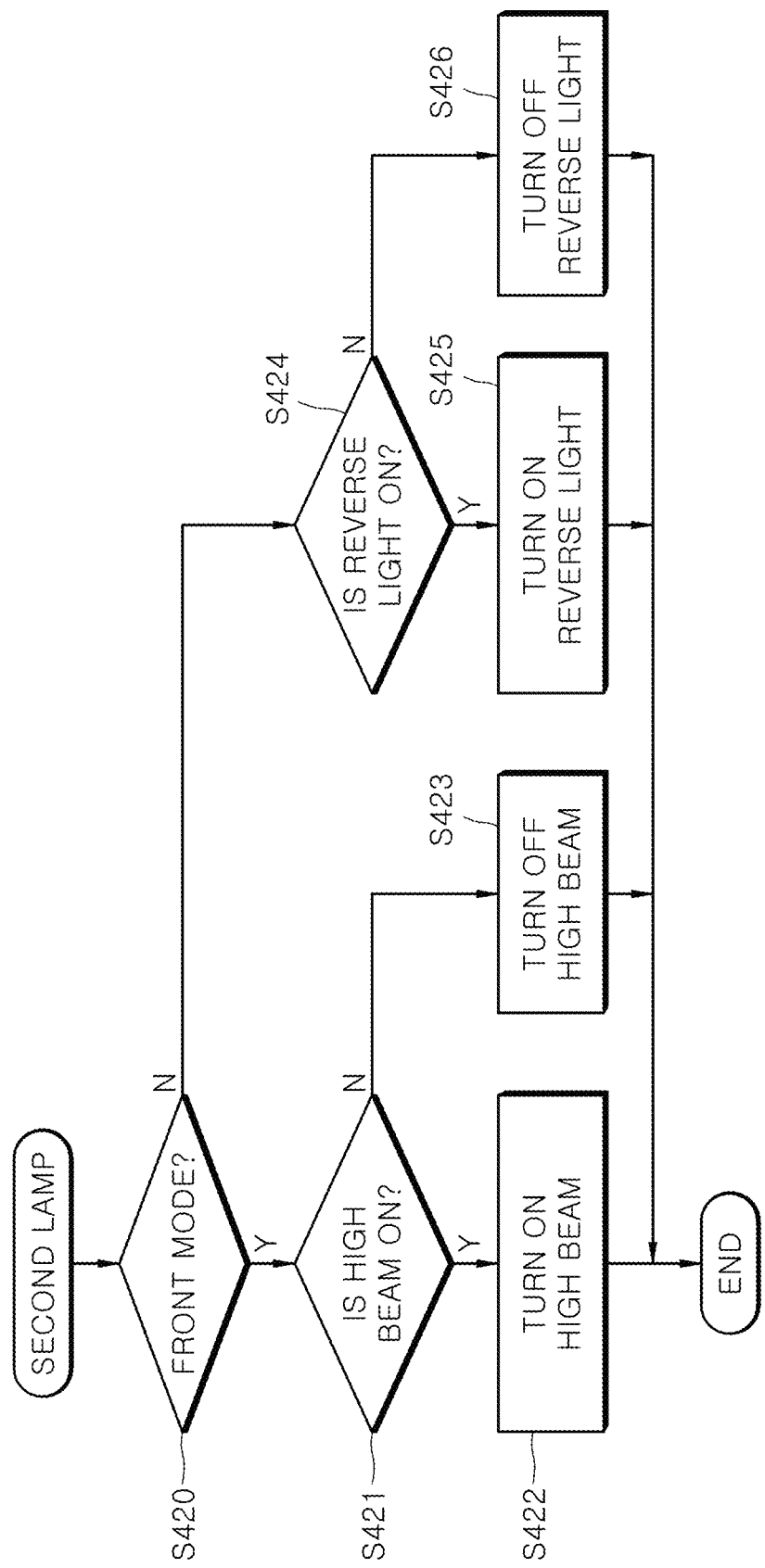

Next, the operation of the second lamp 44 will be described. As illustrated in FIG. 6, the lamp control unit 30 determines whether the lighting mode of the first integrated lamp 40 is the front mode (S420).

When it is determined in step S420 that the lighting mode of the first integrated lamp 40 is the front mode, the lamp control unit 30 determines whether the high beam is on according to the high beam driving signal (S421).

When it is determined in step S421 that the high beam is on, the lamp control unit 30 turns on the second lamp 44 in order to turn on the high beam (S422).

On the other hand, when it is determined in step S421 that the high beam is not on, the lamp control unit 30 turns off the second lamp 44 in order to turn off the high beam (S423).

Meanwhile, when it is determined in step S420 that the lighting mode of the first integrated lamp 40 is not the front mode but the rear mode, the lamp control unit 30 determines whether the reverse light is on according to the reverse light driving signal (S424).

When it is determined in step S424 that the reverse light is on, the lamp control unit 30 turns on the second lamp 44 in order to turn on the reverse light (S425).

On the other hand, when it is determined in step S424 that the reverse light is not on, the lamp control unit 30 turns off the second lamp 44 in order to turn off the reverse light (S426).

Figure 7:
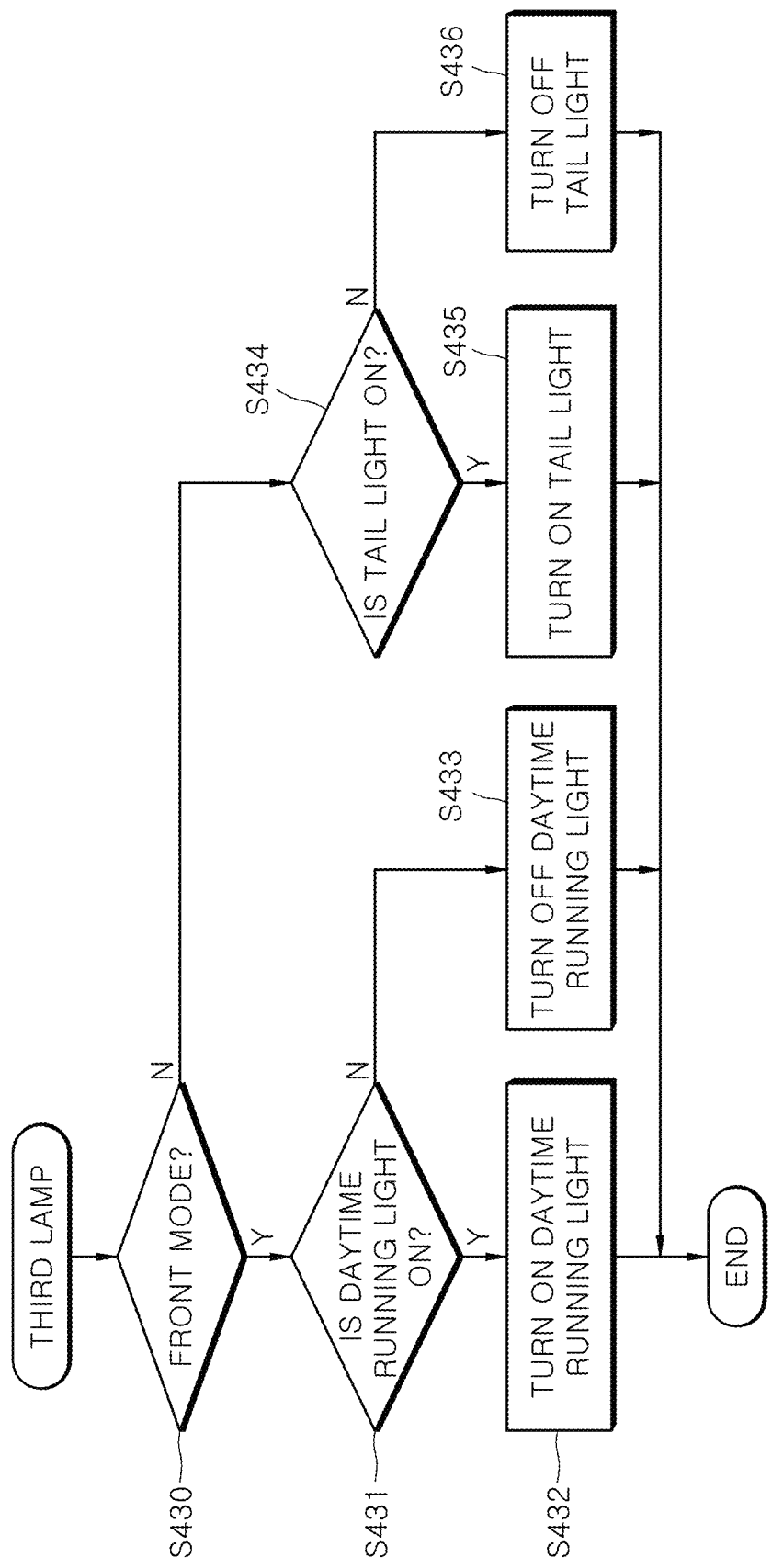

Then, the operation of the third lamp 42 will be described. As illustrated in FIG. 7, the lamp control unit 30 determines whether the lighting mode of the first integrated lamp 40 is the front mode (S430).

When it is determined in step S430 that the lighting mode of the first integrated lamp 40 is the front mode, the lamp control unit 30 determines whether the daytime running light is on according to the daytime running light driving signal (S431).

When it is determined in step S431 that the daytime running light is on, the lamp control unit 30 turns on the third lamp 42 in order to turn on the daytime running light (S432).

On the other hand, when it is determined in step S431 that the daytime running light is not on, the lamp control unit 30 turns off the third lamp 42 in order to turn off the daytime running light (S433).

Meanwhile, when it is determined in step S430 that the lighting mode of the first integrated lamp 40 is not the front mode but the rear mode, the lamp control unit 30 determines whether the tail light is on according to the tail light driving signal (S434).

When it is determined in step S434 that the tail light is on, the lamp control unit 30 turns on the third lamp 42 in order to turn on the tail light (S435).

On the other hand, when it is determined in step S434 that the tail light is not on, the lamp control unit 30 turns off the third lamp 42 in order to turn off the tail light (S436).

Hereinafter, the operations of the fourth lamps 48 and 58 will be described. The fourth lamps 48 and 58 are operated in substantially the same manner with respect to the first integrated lamp 40 and the second integrated lamp 50, and are divided into the fourth lamps 48 and 58 installed on the left side of the vehicle and the fourth lamps 48 and 58 installed on the right side thereof, according to the installation positions.

Figure 8:
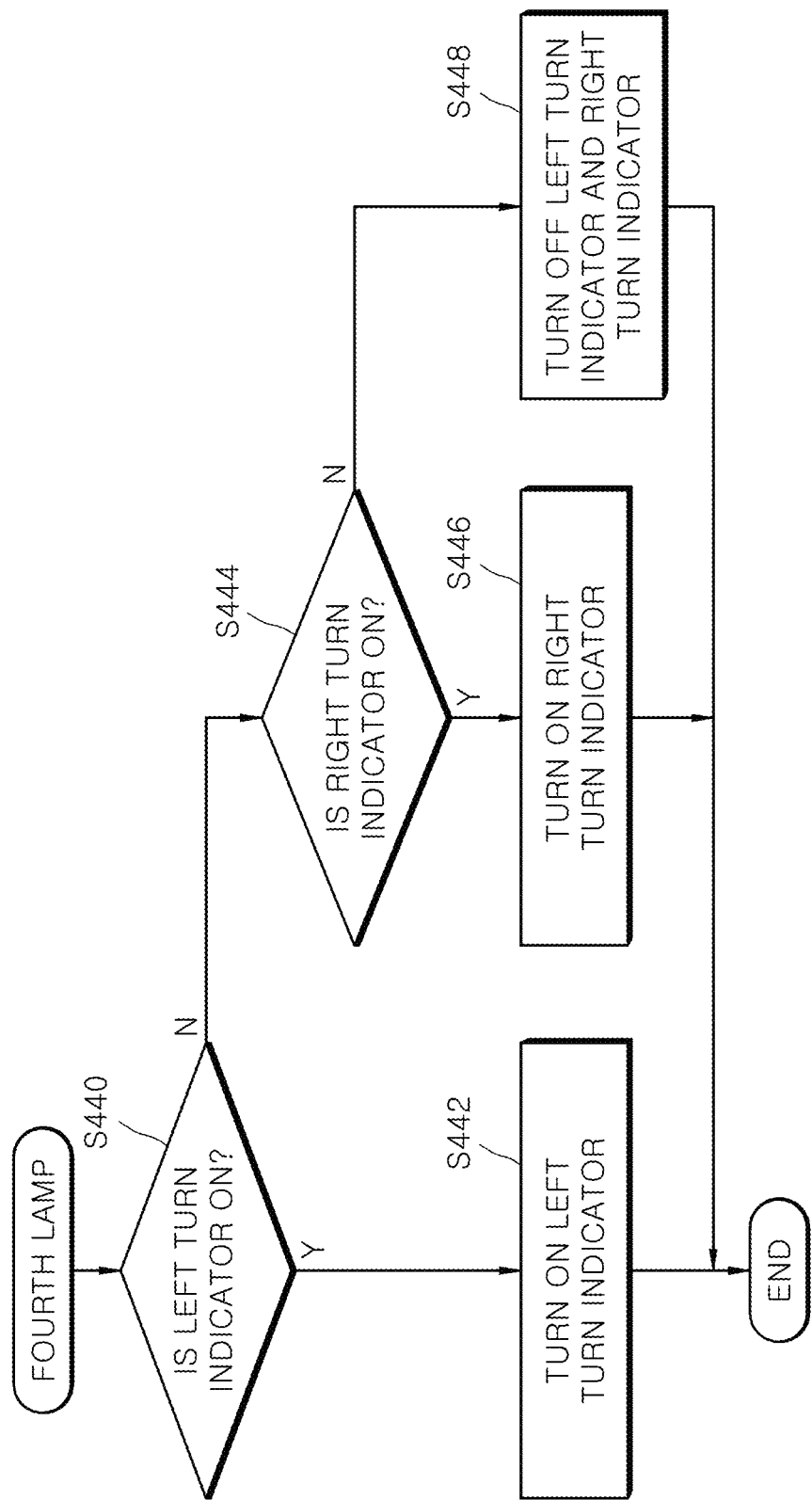

As illustrated in FIG. 8, the lamp control unit 30 determines whether the left turn indicator is on according to the turn indicator driving signal (S440).

When it is determined in step S440 that the left turn indicator is on, the lamp control unit 30 turns on the fourth lamps 48 and 58 installed on the left side of the vehicle in order to turn on the left turn indicator (S442).

On the other hand, when it is determined in step S440 that the left turn indicator is not on, the lamp control unit 30 determines whether the right turn indicator is on (S444).

When it is determined in step S444 that the right turn indicator is on, the lamp control unit 30 turns on the fourth lamps 48 and 58 installed on the right side of the vehicle in order to turn on the right turn indicator (S446).

However, when it is determined in step S444 that the right turn indicator is not on, that is, none of the left turn indicator and the right turn indicator are on, the lamp control unit 30 turns off the fourth lamps 48 and 58, which are installed on the left and right sides of the vehicle, in order to turn off the left turn indicator and the right turn indicator (S448).

Figure 9:
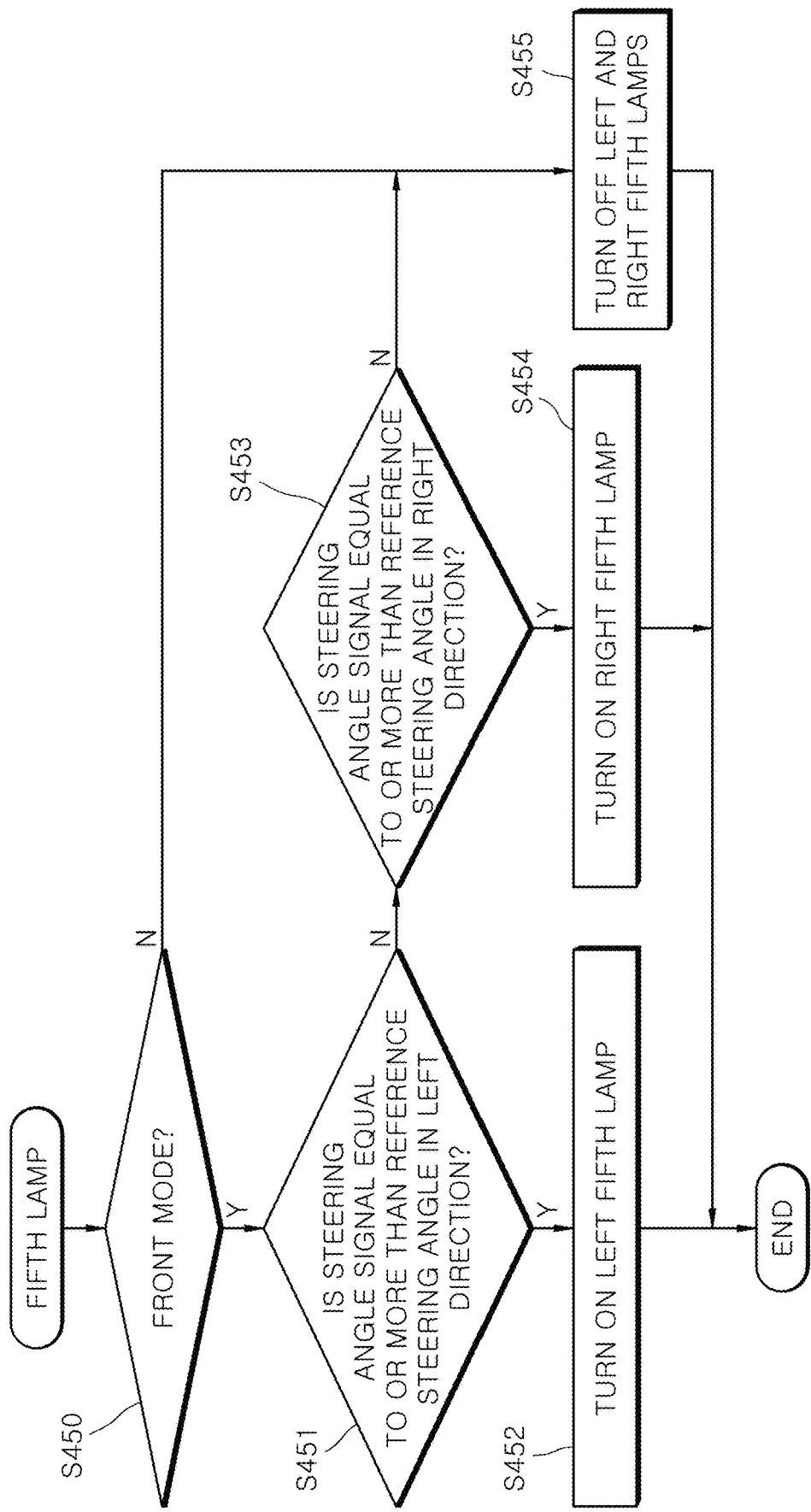

Hereinafter, the operations of the fifth lamps 49 and 59 will be described. As illustrated in FIG. 9, the lamp control unit 30 determines whether the lighting mode of the first integrated lamp 40 is the front mode (S450).

When it is determined in step S450 that the lighting mode of the first integrated lamp 40 is the front mode, the lamp control unit 30 determines whether the steering angle signal corresponds to a preset reference angle or more in the left direction (S451).

When it is determined in step S451 that the steering angle signal corresponds to the reference angle or more in the left direction, the lamp control unit 30 turns on the fifth lamp 49 of the first integrated lamp 40 installed on the left side of the vehicle (S452).

On the other hand, when it is determined in step S451 that the steering angle signal does not correspond to the reference angle or more in the left direction, the lamp control unit 30 determines whether the steering angle signal corresponds to a reference angle or more in the right direction (S453).

When it is determined in step S453 that the steering angle signal corresponds to the reference angle or more in the right direction, the lamp control unit 30 turns on the fifth lamp 49 of the first integrated lamp 40 installed on the right side of the vehicle (S454).

On the other hand, when it is determined in step S453 that the steering angle signal does not correspond to the reference angle or more in the right direction, the vehicle is not turning. Therefore, the lamp control unit 30 substantially maintains the turn-off states of the fifth lamps 49 of the first integrated lamp 40 installed on the left and right sides of the vehicle (S455).

Meanwhile, when it is determined in step S450 that the lighting mode of the first integrated lamp 40 is not the front mode but the rear mode, the lamp control unit 30 substantially maintains the turn-off states of the fifth lamps 49 of the first integrated lamp 40 installed on the left and right sides of the vehicle (S455).

Steps S450 to S455 described above are described on the basis of the first integrated lamp 40 and substantially the same process is also applied to the second integrated lamp 50.

As described above, in accordance with the control method of the lamp apparatus of a vehicle according to an embodiment of the present disclosure, the lamp apparatus of a vehicle is configured with integrated lamps of head lamps and rear lamps, may be installed in the front and rear of the vehicle in the same way, and may perform a head lamp function and a read lamp function according to a travel direction. Therefore, the control method can production and management costs and can be applied to two-way driving by fully autonomous driving.

Furthermore, the implementations described in the present specification may be implemented with a method or process, an apparatus, a software program, and a data stream or signal, for example. Although discussed only in the context of a single form of implementation (for example, discussed only as a method), the discussed features may also be implemented as other forms (for example, an apparatus or a program). The apparatus may be implemented with appropriate hardware, software, firmware and the like. The method may be implemented in an apparatus such as a processor generally referring to a processing device including a computer, a microprocessor, an integrated circuit, or a programmable logic device. The processor includes a communication device such as a computer, a cellular phone, a portable/personal digital assistants (PDA), and other devices that facilitate communication of information between end users.

Although the present disclosure has been described with reference to the embodiments illustrated in the drawings, the embodiments of the disclosure are for illustrative purposes only, and those skilled in the art will appreciate that various modifications and other equivalent embodiments are possible therefrom.

Thus, the true technical scope of the disclosure should be defined by the following claims.

What is claimed is:

1. A lighting system of a vehicle configured to movable in one of forward and rearward directions of the vehicle at a time, the lighting system comprising:
    first and second lamp respectively disposed at front and rear portions of the vehicle and individually configured to operate in one of a plurality of lighting modes at a time, the plurality of lighting modes including a front mode and a rear mode, wherein the first and second lamps are configured to perform a front lamp function when operating in the front mode and perform a rear lamp function when operating in the rear mode;
    a processor; and
    a non-transitory computer readable medium in communication with the processor and storing instructions that, when executed by the processor, cause the processor to control the lighting system to perform:
        determining a travel direction of the vehicle;
        receiving a lamp driving signal configured to drive at least one of the first and second lamps;
        in response to the travel direction indicating that the vehicle moves in the forward direction of the vehicle, performing (1) operating the first lamp in the front mode to perform the front lamp function and (2) operating the second lamp in the rear mode to perform the rear lamp function; and
        in response to the received travel direction indicating that the vehicle moves in the rearward direction of the vehicle, performing (1) operating the first lamp in the rear mode to perform the rear lamp function and (2) operating the second lamp in the front mode to perform the front lamp function.

2. The lighting system of claim 1, wherein the front lamp function comprises outputting one of a low beam light, a high beam light and a daytime running light.

3. The lighting system of claim 2, wherein the rear lamp function comprises outputting one of a stop light, a reverse light and a taillight.

4. The lighting system of claim 3, wherein the lamp driving signal comprises a low beam driving signal or a stop light driving signal.

5. The lighting system of claim 4, wherein the first and second lamps are configured to:
    output the low beam light when operating in the front mode; and
    output the stop light when operating in the rear mode.

6. The lighting system of claim 3, wherein the lamp driving signal comprises a high beam driving signal or a reverse light driving signal.

7. The lighting system of claim 6, wherein the first and second lamps are configured to:
    output the high beam light when operating in the front mode; and
    output the reverse light when operating in the rear mode.

8. The lighting system of claim 3, wherein the lamp driving signal comprises a daytime running light driving signal or a taillight driving signal.

9. The lighting system of claim 8, wherein the first and second lamps are configured to:
    output the daytime running light when operating in the front mode; and
    output the taillight when operating in the rear mode.

10. The lighting system of claim 1, wherein the travel direction is determined based on at least one of a rotational direction of a wheel of the vehicle, a position of a shift lever of the vehicle, and a position of another vehicle traveling in a direction opposite to that of the vehicle.

11. A method of operating a light system of a vehicle, the vehicle comprising first and second lamps respectively disposed at front and rear portions of the vehicle, the first and second lamps individually configured to operate in one of a plurality of lighting modes at a time, the plurality of lighting modes including a front mode and a rear mode, wherein the first and second lamps are configured to perform a front lamp function when operating in the front mode and perform a rear lamp function when operating in the rear mode, the method comprising:
    determining a travel direction of the vehicle;
    receiving a lamp driving signal configured to drive at least one of the first and second lamps;
    in response to the travel direction indicating that the vehicle moves in the forward direction of the vehicle, performing (1) operating the first lamp in the front mode to perform the front lamp function and (2)

operating the second lamp in the rear mode to perform the rear lamp function; and in response to the received travel direction indicating that the vehicle moves in a rearward direction of the vehicle, performing (1) operating the first lamp in the rear mode to perform the rear lamp function and (2) operating the second lamp in the front mode to perform the front lamp function.

12. The method of claim 11, wherein the front lamp function comprises outputting one of a low beam light, a high beam light and a daytime running light.

13. The method of claim 12, wherein the rear lamp function comprises outputting one of a stop light, a reverse light and a taillight.

14. The method of claim 13, wherein:

receiving the lamp driving signal comprises receiving a low beam driving signal or a stop light driving signal, and the first and second lamps are configured to:
output the low beam light when operating in the front mode; and
output the stop light when operating in the rear mode.

15. The method of claim 13, wherein:

receiving the lamp driving signal comprises receiving a high beam driving signal or a reverse light driving signal, and the first and second lamps are configured to:
output the high beam light when operating in the front mode; and
output the reverse light when operating in the rear mode.

16. The method of claim 13, wherein:

receiving the lamp driving signal comprises receiving a daytime running light driving signal or a taillight driving signal, and the first and second lamps are configured to:
output the daytime running light when operating in the front mode; and
output the taillight when operating in the rear mode.

17. The method of claim 11, wherein determining the travel direction comprises determining the travel direction based on at least one of a rotational direction of a wheel of the vehicle, a position of a shift lever of the vehicle, and a position of another vehicle traveling in a direction opposite to that of the vehicle.

* * * * *